Patented Sept. 18, 1934

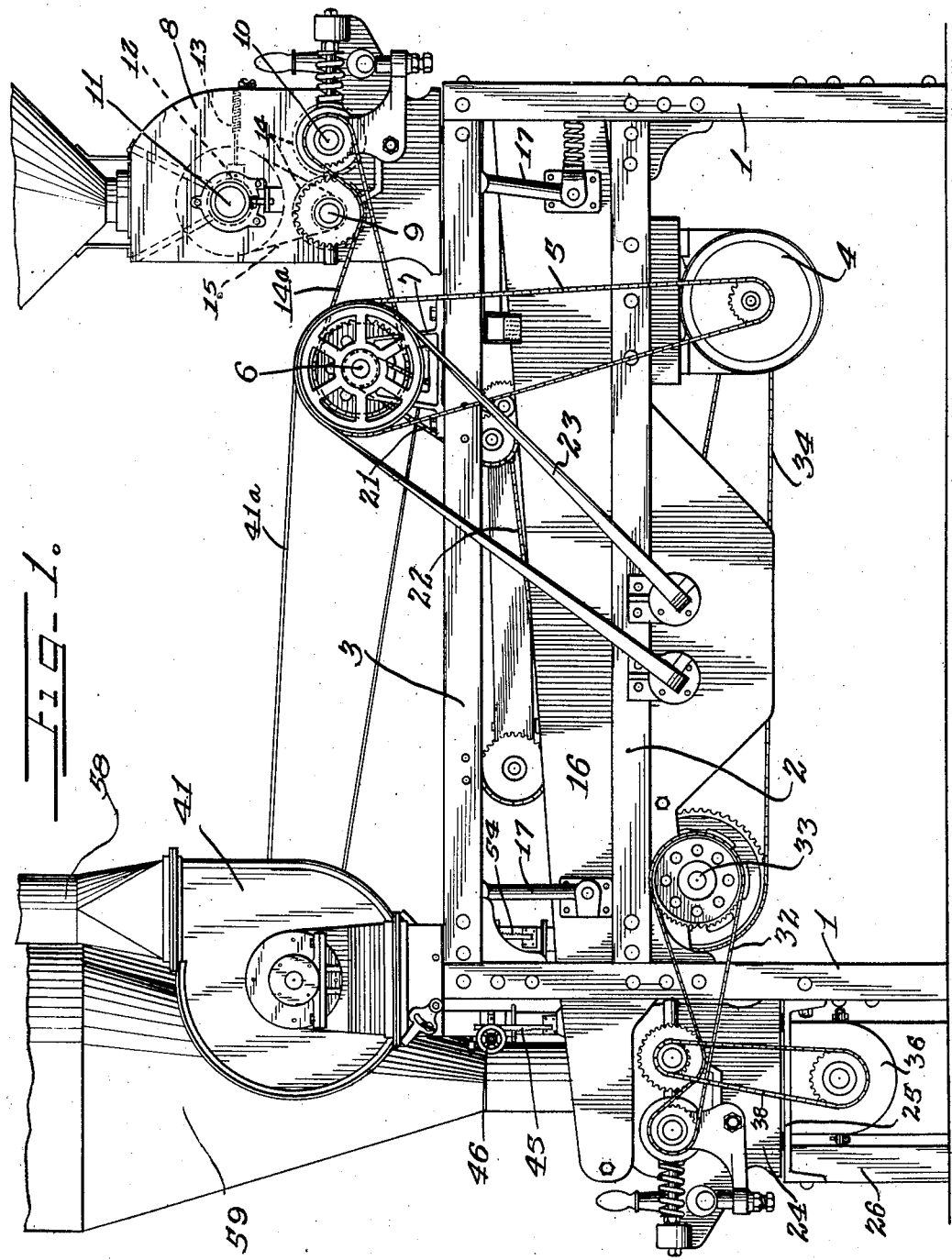

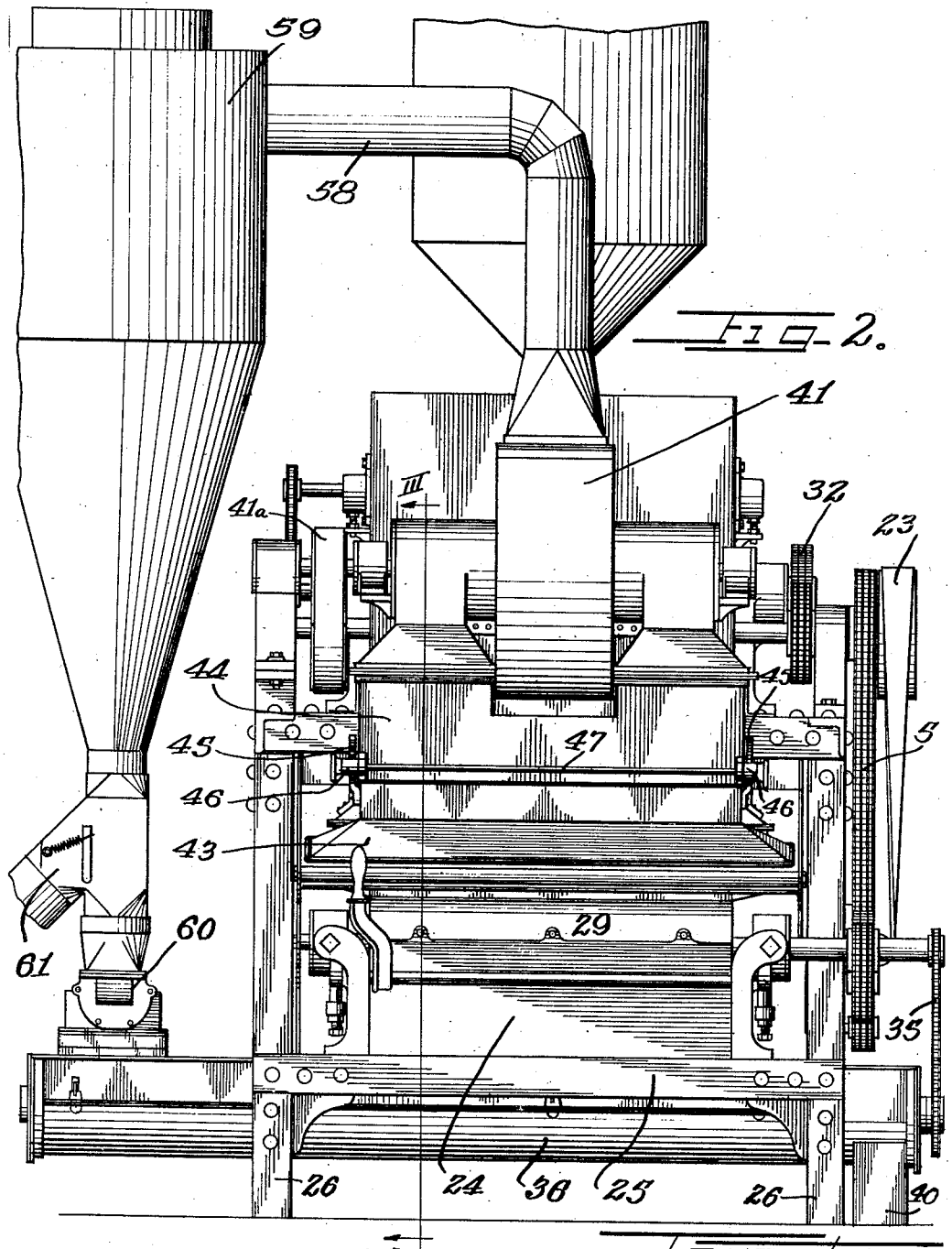

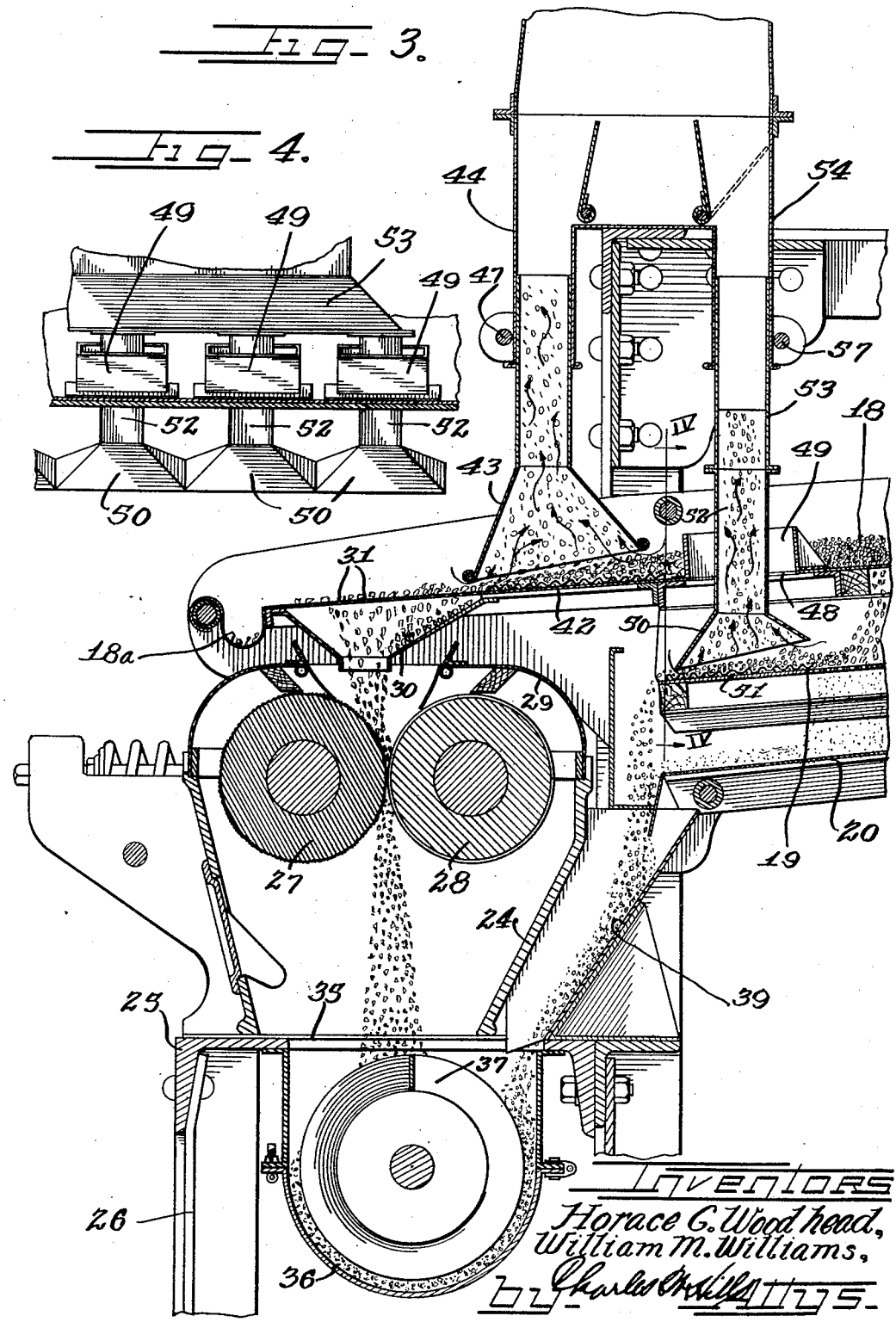

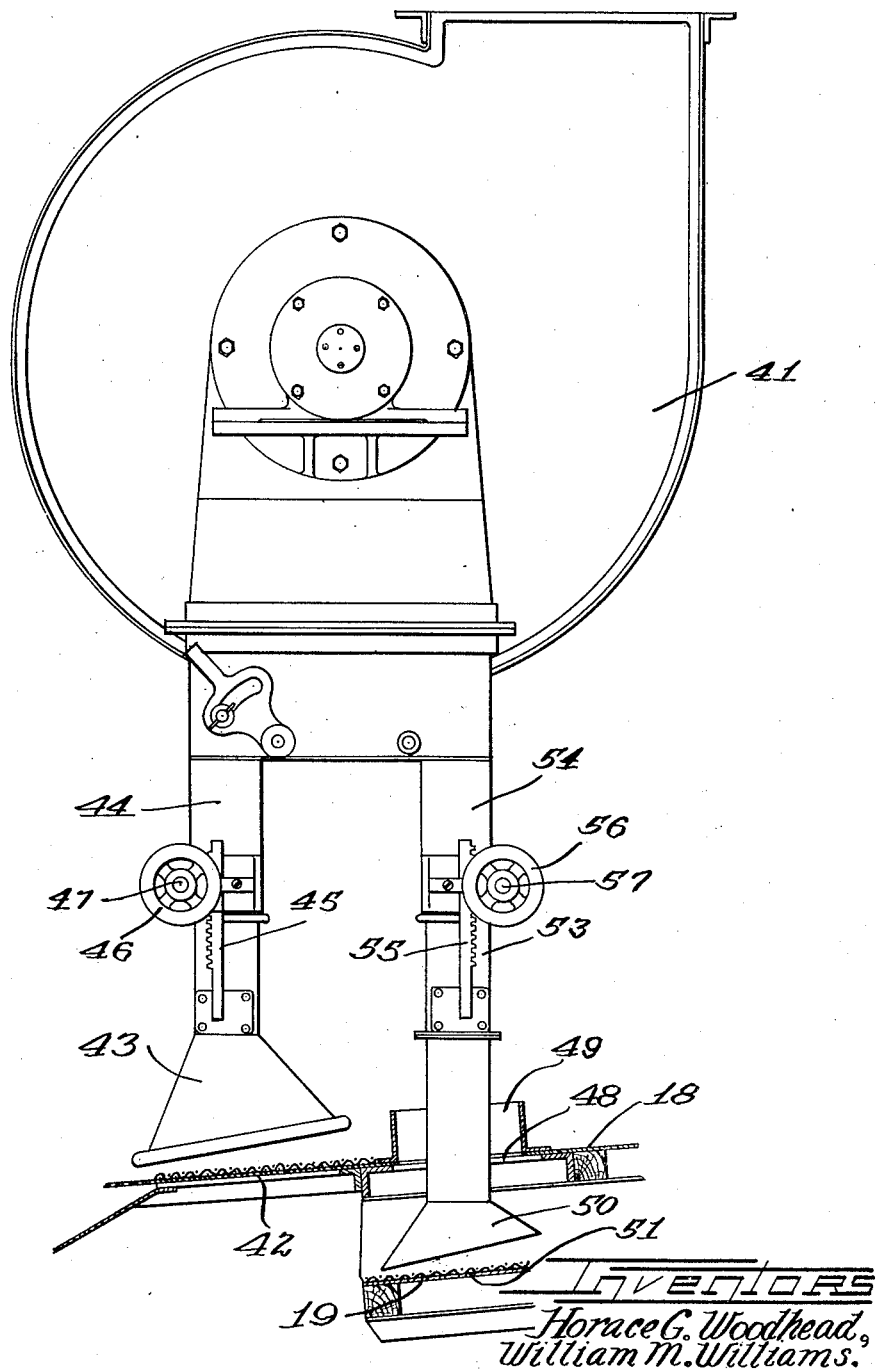

1,973,836

UNITED STATES PATENT OFFICE 1,973,836

COFFEE CUTTING MACHINE

Horace G. Woodhead and William M. Williams, Chicago, Ill., assignors to B. F. Gump Co., Chicago, Ill., a corporation of Illinois Application November 10, 1930, Serial No. 494,510

8 Claims. (Cl. 83—12)

This invention relates to a coffee granulator.

In the past, it has been the general practice to use a set of breaker rolls or the like and a set of granulating or cutting rolls for reducing the coffee bean. In such machines, the tailings were returned through a vertical elevator to the cutting rolls for further reduction. The use of such an elevator rendered the machines more or less bulky and clumsy and the passage of the tailings through the cutting rolls greatly reduced the capacity of the machine.

This invention is designed to overcome these objections in the elimination of the vertical elevators and the provision of a separate set of rolls for cutting or granulating the tailings.

The invention further embodies in its organization a pair of sieves for thoroughly removing the chaff together with means for grinding the chaff and mixing it with the finished coffee.

The invention comprises the novel structure and combination of parts hereinafter described and more particularly pointed out and defined in the appended claims.

In the accompanying drawings which illustrate a preferred form of this invention and in which similar reference numerals refer to similar features in the different views.

Figure 1 is a side elevational view of a coffee granulator involving this invention.

Figure 2 is a rear end elevational view of the machine.

Figure 3 is a fragmentary sectional view upon an enlarged scale through the machine.

Figure 4 is a fragmentary enlarged sectional view taken upon the line VI—VI of Figure 3.

Figure 5 is a fragmentary part elevational and part sectional view of certain parts of the machine.

In referring to the drawings, it will be noted that the operative parts of the coffee granulator are supported upon a frame consisting of legs 1 connected by longitudinal rails 2 and 3. A motor 4 is suspended from the rails 2 and is connected by sprocket gearing 5 to a shaft 6 journalled in brackets 7 upon the upper rails 3. Upon the forward part of the rails 3 there is a granulator casing 8 in which shafts 9, 10 and 11 are suitably journalled. The shaft 11 carries a breaker roll 12 that coacts with a breaker bar 13 for breaking up the coffee bean. The shafts 9 and 11 carry corrugated rolls 14 that granulates or reduces the coffee beans about fifty per cent. This granulating mechanism is substantially the same as is disclosed in the Williams Patent No. 1,682,454 of which this application is an improvement, except that the present arrangement effects only about a fifty percent reduction. The shafts 9 and 10 are driven from the shaft 6 by means of sprocket gearing 14a as shown in Figure 1, and the shaft 11 is driven by sprocket gearing 15 from the shaft 9.

Within the frame, there is movably or rockably suspended a sieve box 16 by means of pivoted hangers 17. This sieve box carries an upper sieve 18, (Figure 3) a lower sieve 19 and a finished coffee receiving chute 20 below the lower sieve 19. It will be understood that the sieve box is adapted to be vibrated by any suitable mechanism operated from the shaft 6. The driving connections from the shaft 6 are indicated at 21, 22 and 23, but the vibrating mechanism has not been fully illustrated as it involves no part of this invention. The sieve box is downwardly inclined so that the granulated mass may gravitate downwardly.

Upon the rear end of the frame, there is suitably supported a casing 24 (Figure 3). A channel member 25 having one flange bolted to the rear legs 1 and supported at its outer end upon short posts 26 may form the support for the casing 24. Within the casing 24 there are journalled a pair of corrugated granulating rolls 27 and 28 which are adapted for granulating the tailings, that is the coarse particles that do not pass through the upper sieve 18. The casing 24 embodies a cover member 29 having an opening into which a funnel 30 empties and which funnel is attached to the bottom of the scalping portion of sieve 18 and is adapted for receiving the tailings from the upper sieve which has enlarged perforations 31 in such scalping portion directly over the funnel. The waste matter which does pass through the scalping portion or holes 31 of sieve 18 gravitates into a runway 18a at the end of the sieve 18.

The tailing rolls 27 and 28 are geared together as shown in Figure 1 and the roll 27 is driven by sprocket gearing 32 connected to a shaft 33 which is driven by sprocket gearing 34 from the motor 4.

Below the channel 25 which is cut away as indicated at 35 (Figure 3) below the casing 24, there is a mixing chamber formed by a housing 36 attached to the bottom of the channel 25. A spiral mixer 37 is journalled in the mixing chamber and is driven by sprocket gearing 38 connected to the shaft of roll 28. A chute 39 leads from the finished coffee chute 20 and discharges into the mixing chamber 36. The granulated coffee from the tailing rolls 27, 28 discharges into the mixing chamber through the opening 35 and joins the finished coffee from the chute 20. The finished product after being thoroughly mixed by the spiral agitating element 37 is discharged through a discharge chute 40 (Figure 2) extending downwardly from the rear end of the mixing chamber. This discharge chute may lead to a bin or receptacle for receiving the finished product.

Mechanism has been provided for removing or aspirating the chaff from both sieves, collecting the same, and grinding the same and spouting the same into the mixing chamber if desired. To this end, a fan 41 is mounted upon the machine and connected by means of a belt 41a and suitable pulleys with the shaft 6. Extending over an imperforated portion 42 of the upper sieve 18 there is an adjustable hood 43 which telescopes into a sheet metal hood 44 attached to and communicating with the fan casing. Upon the ends of the upper portion of the hood 43 are secured rack bars 45 which are engaged by cog wheels 46 secured upon a rod 47 journalled in suitable bearings upon the lower portion of the fan hood 44.

The upper sieve is provided with a row of openings 48 in which short rectangular sleeves 49 are secured. A plurality of small hoods 50 side by side are located over an imperforate portion 51 of the lower sieve 19. Each hood has a hollow upstanding neck or tube 52 that extends through a sleeve 49 and that is secured to and communicates with a sheet metal sleeve 53. The sheet metal sleeve 53 telescopes in a second far hood 54 similar to the fan hood 44, and is adjustable in a similar manner through racks 55 (Figure 5) on the ends of the sleeve and cog wheels 56 supported upon a rod 57 journalled in bearings upon the fan hood 54.

Consequently the operation of the fan which creates a vacuum in the fan casing will draw up the chaff from the two sieves or screens through the two hood mechanisms just described. From the fan 41, the chaff passes through a pipe 58 to a chaff collector 59 commonly called a cyclone collector which is located over the mixing chamber 36. This chaff collector is connected to a chaff grinder generally denoted by the reference numeral 60. The connection between the chaff collector and chaff grinder contains a valved outlet 61 whereby the chaff may be diverted from the chaff grinder when it is not desired to grind the same for mixing with the finished coffee.

In the operation of this machine, the coffee beans are passed through the breaking mechanism consisting of the roll 12 and breaker bar 13. It then passes between the granulating rolls 14 where about fifty per cent is reduced to finished coffee. The granulated product with the chaff which has been liberated by the breaking and granulating rolls, falls upon the upper screen and the finer particles fall through such screen and upon the second screen 19. The fine flour will fall through the second screen upon the chute 20. The granulated coffee upon the screen 19 and the finer portion upon the chute 20 will gravitate downwardly and fall through the chute 39 to the mixing chamber. The smaller particles of chaff that escape through the first screen will be intercepted by the second screen and be removed by aspiration through the suction hoods 50, and fan to the chaff collector.

The main part of the chaff and the tailings will gravitate down the upper screen. The chaff will be removed by the suction hood 43 and fan to the chaff collector while the tailings will fall through the scalping portion of screen 18 and between the tailing rolls 27 and 28 and be granulated. After the tailings are granulated, they will fall into the mixing chamber 36.

If it is desired to grind the chaff and mix it with the finished coffee, the chaff grinder will be operated and the ground chaff will fall into the mixing chamber 36 and be mixed with the finished coffee through the instrumentality of the spiral conveying and mixing element 37, if the valved outlet 61 is closed.

It will be obvious that the machine is simple and compact and that the usual elevators for elevating the tailings and ground coffee are eliminated. It will also be appreciated that the use of a second pair of granulating rolls for reducing the tailings so that the same need not be passed through the first set of granulating rolls will greatly increase the capacity of the machine. It has been found in practice that the capacity of the machine is increased fifty per cent.

We are aware that many details of construction may be varied through a wide range without departing from the principles and scope of the invention, and we therefore do not purpose limiting the patent granted hereon otherwise than necessitated by the prior art.

We claim as our invention:

1. In a coffee granulator, means for granulating the coffee bean and liberating the chaff, a sieve for receiving the granulated mass and intercepting the chaff and tailings, said sieve having an imperforate portion and a scalping portion beyond said imperforate portion, aspirating means in operative relation with said imperforate portion for removing the chaff, tailing rolls and means for passing the tailings from said scalping portion to said rolls.

2. In a coffee granulator, means for granulating the coffee bean and liberating the chaff, a sieve for receiving the granulated mass and intercepting the chaff and tailings, means for aspirating the chaff, said sieve having a scalping portion adjacent its rear end, a funnel attached to said sieve beneath said scalping portion and tailings rolls beneath said funnel for granulating the tailings.

3. In a coffee granulator, means for granulating the coffee bean and liberating the chaff, a sieve for receiving the granulated mass and intercepting the chaff and tailings, means for aspirating the chaff, said sieve having an enlarged mesh beyond said aspirating means for the escape of said tailings, tailings rolls and means for guiding the tailings from said enlarged mesh to said rolls.

4. In a coffee granulator, means for granulating the coffee bean and liberating the chaff, a sieve for receiving the granulated mass and intercepting the tailings and coarse chaff, a second sieve terminating short of the first sieve and located therebeneath for intercepting the fine chaff, aspirating means for removing the chaff from the first screen, said first screen having apertures above the second screen, collars secured in said apertures, chaff aspirating tubes extending thru said collars, a pair of tailings rolls beyond said second screen and located beneath said first screen for receiving said tailings, a coffee receptacle below said tailings rolls and a finished coffee chute leading from said second screen to said receptacle.

5. In a coffee granulator, means for cracking the coffee beans and liberating the chaff, rolls for partially granulating the cracked coffee, a sieve for receiving the granulated mass and intercepting the chaff and tailings, said sieve having an imperforate portion and an enlarged mesh beyond said imperforate portion thru which the tailings are adapted to pass, aspirating means in operative relation with said imperforate portion and tailings granulating rolls beneath the enlarged mesh portion for granulating the tailings.

6. An apparatus for reducing a material having a chaff to a desired state of comminution, comprising the combination of means for feeding a substantially continuous stream of material to be comminuted, a first comminution means for subjecting the whole continuous stream to a comminuting action whereby at least a portion thereof is reduced to the desired state of comminution, means for separating out of the stream after action of the first comminution means substantially all material reduced to the desired state of comminution, means for removing chaff from the remaining portion of the stream, means for comminuting the chaff, a second comminution means for subjecting the remaining portion of the stream to another comminution action, and means for feeding the comminuted chaff into the material discharged from the second comminution means.

7. An apparatus for reducing a material having a chaff portion to a desired state of comminution, comprising the combination of means for feeding a substantially continuous stream of material to be comminuted, a first comminution means for subjecting the whole of the stream to a comminuting action, means for separating out of the stream after action of the first comminution means substantially all material reduced to the desired state of comminution, a mixing means for receiving the material reduced to the desired state of comminution, means for removing substantially all the chaff portion from the remaining portion of the stream, means for comminuting the chaff, a second comminution means for subjecting the remaining portion of the stream to another comminution action, means for discharging material from the second comminution means into the mixing means, and means for feeding comminuted chaff into the ground material in the mixing means.

8. Apparatus for reducing bean or granular coffee and the like to a desired size, comprising a comminuting device having cutting means arranged to reduce a large portion of the material to the desired final size, a second comminuting device, means for feeding a substantially continuous stream of material to the first comminuting device, a screen interposed between said comminuting devices having apertures arranged to extract from the stream the particles of the desired final size produced by the first comminuting device, a mixing device arranged to receive the particles of the desired final size from said screen, means for removing chaff from the remaining stream of coarser particles, means for separately comminuting said chaff and for feeding the comminuted chaff to said mixing device, means for feeding the remaining stream of coarser particles to the second comminuting device and for feeding the comminuted material discharged therefrom into said mixing device, the second comminuting device having cutting means arranged to reduce said coarser particles to substantially the same final size as the particles extracted by said screen, and said mixing device having means for mixing the chaff with the particles of final size produced by the first and second comminuting devices.

HORACE G. WOODHEAD.
WILLIAM M. WILLIAMS.